No. 844,847. PATENTED FEB. 19, 1907.
G. W. BEYNON & G. H. MACKILLOP.
DOUBLE ACTING STAMP.
APPLICATION FILED JAN. 16, 1906.

4 SHEETS—SHEET 4.

WITNESSES
Paul A Blais.

INVENTORS
George William Beynon
Gardiner Henderson Mackillop
BY
Howson and Howson
ATTORNEYS

UNITED STATES PATENT OFFICE.

GEORGE WILLIAM BEYNON, OF MORTIMER, AND GARDINER HENDERSON MACKILLOP, OF MAIDENHEAD, ENGLAND; SAID BEYNON ASSIGNOR TO GUSTAVE RICHARD BONNARD, OF LONDON, ENGLAND.

DOUBLE-ACTING STAMP.

No. 844,847.     Specification of Letters Patent.     Patented Feb. 19, 1907.

Application filed January 16, 1906. Serial No. 296,342.

*To all whom it may concern:*

Be it known that we, GEORGE WILLIAM BEYNON, a subject of the King of Great Britain and Ireland, residing at Mortimer West End, Mortimer, in the county of Hants, England, civil engineer, and GARDINER HENDERSON MACKILLOP, a subject of the King of Great Britain and Ireland, residing at Woodbine, Maidenhead, in the county of Berks, England, civil engineer, have invented new and useful Improvements in Double-Acting Stamps, of which the following is a specification.

This invention relates to apparatus for pulverizing, crushing, stamping, and other operations performed by a weight or weights which is or are lifted and then allowed to fall, in which apparatus rotating cams are used to bear on a tappet or on tappets on or in connection with the weight or weights to be lifted and then allowed to fall and in which a device is provided by which additional impulse is given to the weight or weights during its or their descents, so as to accentuate or increase the effect of the falling weight or weights by driving it or them positively downward, so that the apparatus can be driven at a higher speed than it otherwise could be.

The object of the present invention is to provide apparatus by means of which such additional impulse is given in a very efficient manner during each descent of the weight or weights in machines in which two lifts are given to the weight or weights at each rotation of the shaft carrying the cams, so that the machine can be driven at much greater speed and with better effect, and a further object of this invention is to provide cams by which the weight or weights is or are lifted without initial objectionable shock when the cam first comes into contact with the tappet and so that the raising action of the cam is gradually discontinued before the cam leaves the tappet, so that the tappet has no appreciable upward momentum when the cam leaves it and there is no objectionable shock on the cam, and the apparatus works more smoothly and efficiently than hitherto.

We will describe, with reference to the accompanying drawings, the arrangement in accordance with this invention as applied to a stamp for crushing ores, from which its analogous applications will also be understood.

Figure 1:
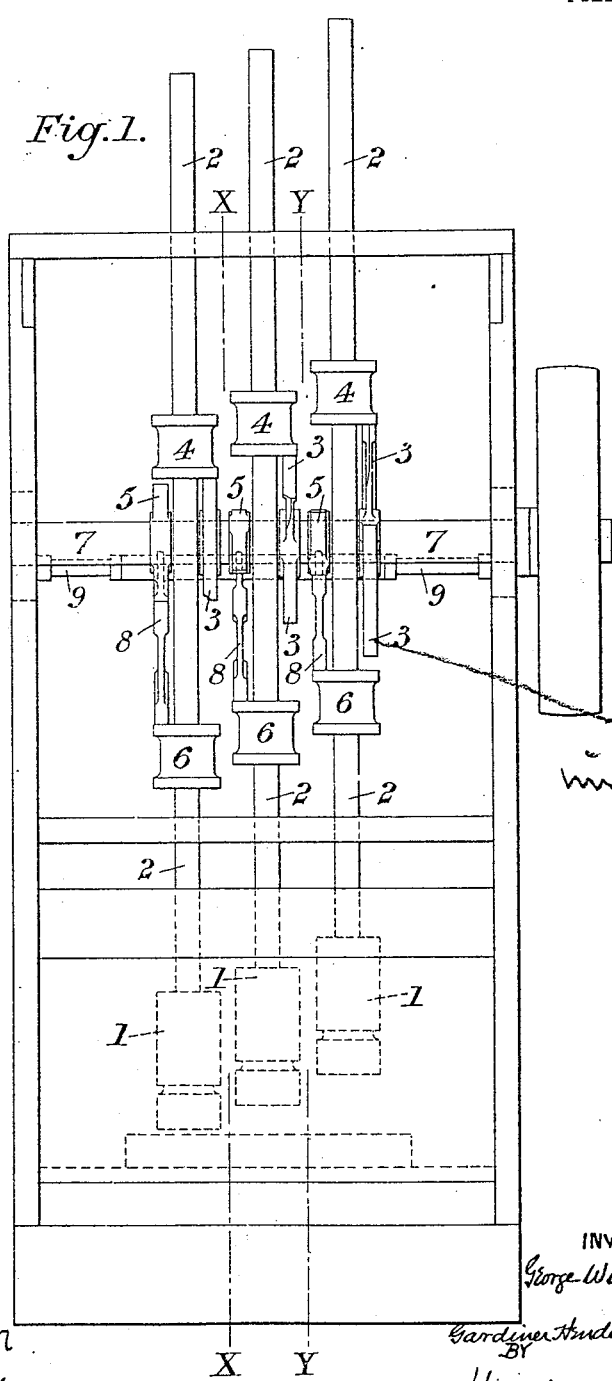
Figure 2:
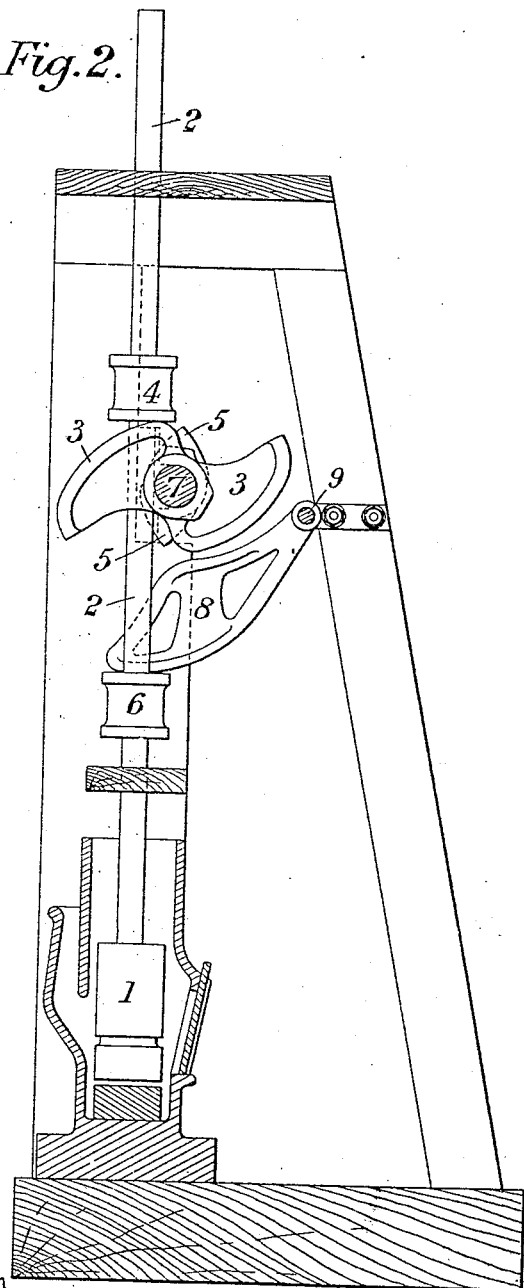
Figure 3:
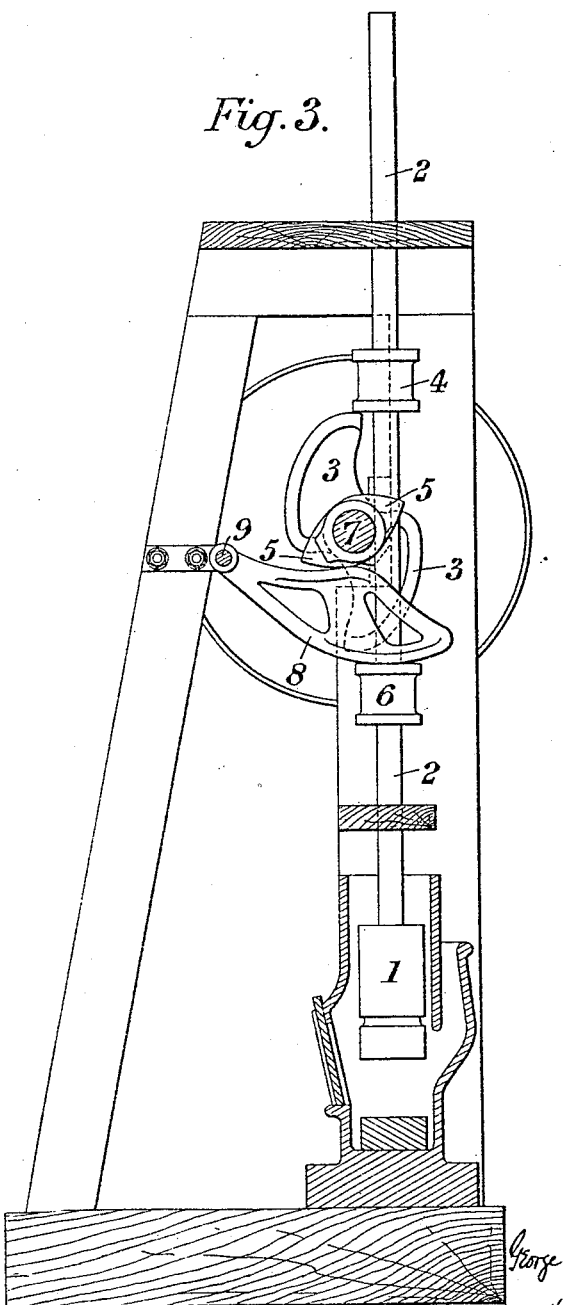
Figure 4:
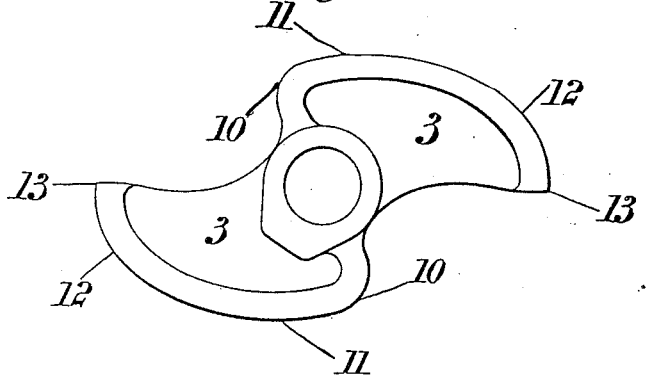
Figure 5:
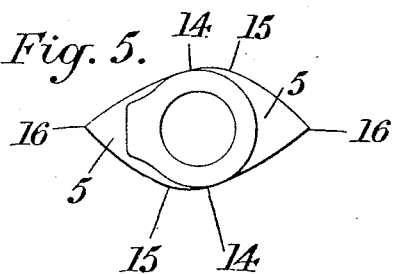

Figure 1 represents in front elevation, and Figs. 2 and 3 in vertical sections, respectively taken on the lines X and Y, a part of a stamping-battery, showing three stamp-heads, it being understood that one or any desired number can be used. Fig. 4 shows a pair of the lifting-cams separately, and Fig. 5 shows a pair of the supplementary cams separately.

The stamp-heads 1 are each attached to or formed on the lower end of a stem 2, and a pair of lifting-cams 3 acts on the respective tappets 4, one of which is fixed to each stem, so that the stamps are lifted twice for each rotation of the shaft. A pair of supplementary cams 5 acts through the medium of a hinged lever on other tappets 6 to give the falling stamps additional downward impulse after each lift. The tappets 4 and 6 are fixed to the stems 2 at such distance apart that they do not interfere with the cams which are not to act upon them, and one shaft 7 is utilized for both the cams 3 and the cams 5, thus dispensing with much gear and greatly simplifying the construction and driving of the apparatus. In order to allow one shaft 7 to carry both the cams 3 and the cams 5 without undue distance between the several stamp-heads, each pair of supplementary cams 5 acts on the tappets 6 through the intervention of a lever 8, centered on the rod 9, the cams 5 acting on the upper sides of these levers and the lower sides of the said levers acting on the tappets 6.

The supplementary cams 5 are each made of the curvatures shown, so that the cam begins to act gradually by a quick curving of the cam (from 14 to 15) and then acts rapidly by a more rapid rise or flatter curving of the cam, (from 15 to 16,) so that a quicker impulse or accelerating of downward motion is given to the stamp positively by the cams—say up to the first third or first half of its descent—and this accelerated descent is maintained sufficiently during the remaining portion of the descent of the stamp to give a more rapid and efficient operation of the stamp.

We are aware that it has been proposed to give a lift and a downward impulse by cams on the same shaft; but the arrangements have not been such as to be applicable to apparatus in which two lifts are given for each rotation of the shaft.

As regards the lifting-cams 3, it is preferred to make them as follows: Each such cam is made nearly concentric, or with a quicker curve, at the part (from 10 to 11) which first comes into contact with the tappet 4 and also at the lower end or part (12 to 13) which last leaves the tappet 4, the portion of the cam (that from 11 to 12) between the aforesaid first and last portions being made with a flatter curving or more rapid rise, so that the stamps are lifted more rapidly during the period of action from 11 to 12 than is the case while the parts from 10 to 11 and from 12 to 13 are in action. The lifting-cams, formed as described and shown, are applicable to stamps with or without additional cams 5 and tappets 6. In stamps for crushing ores it is desirable to give a rotary motion to the stamp-head while it is raised, and the lifting-cams, formed as aforesaid, give this motion very efficiently, although the said cams are also applicable in cases where such rotary motion is not required to be given to the heads.

We claim as our invention—

1. In double-acting stamp-machines and the like, a stamp-head, a stem carrying the same, and two tappets arranged on said stem, in combination with a pair of lifting-cams and a pair of downward-impulse-giving cams carried by one shaft, the lifting-cams being adapted to act on one tappet, and the downward-impulse-giving cams being adapted to give, through the other tappet, a downward impulse at each descent of the weight.

2. In double-acting stamp-machines and the like, a stamp-head, a stem carrying the same, two tappets arranged on said stem in combination with a pair of lifting-cams and a pair of downward-impulse-giving cams carried by one shaft, the lifting-cams adapted to act on one tappet, and the downward-impulse-giving cams adapted to act, in combination with an intervening lever, upon the other tappet, to give a downward impulse at each descent of the weight.

3. In double-acting stamp-machines and the like, a stamp-head, a stem carrying the same, two tappets arranged on said stem in combination with a pair of lifting-cams and a pair of downward-impulse-giving cams carried by one shaft, the lifting-cams being adapted to act on one tappet and each of the downward-impulse-giving cams having the portion which first acts made of quick curvature and the part which follows this made with a flatter curvature, or quicker rise, the said cams being adapted to act in combination with an intervening lever, upon the other tappet, at each descent of the weight.

In testimony whereof we have signed this specification in the presence of two subscribing witnesses.

GEORGE WILLIAM BEYNON.
GARDINER HENDERSON MACKILLOP.

Witnesses:
WILLIAM THOMAS RUSHTON,
H. D. JAMESON.